Patented Nov. 30, 1943

2,335,407

UNITED STATES PATENT OFFICE 2,335,407

BONDED REFRACTORY AND METHOD OF MAKING SAME

Victor Moritz Goldschmidt, Smestad, Norway; vested in the Alien Property Custodian No Drawing. Application August 23, 1940, Serial No. 353,906. In Great Britain October 6, 1939

16 Claims. (Cl. 106—59)

This invention relates to bonded refractories containing substantial amounts of magnesium orthosilicate. It is known to manufacture refractory building materials which contain substantial amounts of magnesium orthosilicate ($Mg_2SiO_4$) or in which magnesium orthosilicate is the main constituent. For instance, such refractory materials have been made from natural olivine rocks, such as dunite. Although such refractory materials have been found very useful for many purposes, there are certain difficulties connected with the use of magnesium orthosilicate refractory material. These difficulties consist mainly in a disintegration or peeling off of the refractory bricks or shapes after prolonged service at very high temperatures, especially in the roofs of open hearth furnaces. According to extensive investigations made by me, this special type of disintegration is found to be due to a recrystallisation of the magnesium orthosilicate near the heated surface of the refractory, the recrystallized portions being separated by cracks and fissures from the remainder of the refractory bodies. A very large tonnage of refractory bricks is consumed annually for building of roofs of open hearth furnaces and for more than ten years it has been considered of much importance to make improved refractories for that purpose, instead of the silica brick now mostly in use. Also for other purposes, such as, for instance, electric arc furnaces it is very desirable to make improved refractories, for instance as a substitute for chrome-magnesite brick.

While until now commercial refractory products containing natural substances rich in magnesium orthosilicate, such as olivine rock or a substantial or main constituent have been made from comminuted raw materials in such a manner that the fired products have a porosity of about 25 to 30 per cent by volume, or even more, the present invention is based upon the discovery that the disadvantage of peeling off can be substantially reduced or avoided if a highly refractory product is made which is less porous than the magnesium orthosilicate refractories which have been used commercially hitherto.

Occasionally relatively dense products containing magnesium orthosilicate have been made on an experimental scale. Such products, having apparent porosities of, for instance, between about 18 and 24 per cent by volume have been described; however, such products have been made with incorporation of excessive amounts of substances acting as fluxes, such as sodium silicate in excess of 2 per cent by weight, or highly aluminous cement in excess of 5 per cent by weight, thereby deteriorating the refractory properties to such a degree that commercial use for such purposes, as for basic open hearth furnace roofs, has been impossible. Dense magnesium orthosilicate has been made on an experimental scale from hydrous silicates by heating them to a temperature of excessive shrinkage, thereby destroying the shape of the products, thereby rendering the process useless for the production of bonded refractories.

Satisfactory products according to the present invention are obtained if the porosity is reduced to not more than 22 per cent by volume, as measured in the usual manner by means of immersing the shaped product in a liquid and afterwards measuring the amount of liquid absorbed. Thus the "apparent porosity" is found which for practical purposes gives a satisfactory measure.

Very much better results are achieved with products the apparent porosity of which does not exceed 20 per cent by volume. It has been found that highly refractory fosterite products can be regularly manufactured according to methods described hereinafter, and such products having a volume porosity of less than 20 per cent, for instance about 18 or 19 per cent, give excellent results in practice. It has been found possible to manufacture such products which have a volume porosity less than 15 per cent and even down to about 10 per cent. For most purposes, however, such products having an apparent volume porosity of between 15 and 20 per cent have been found to be preferable.

According to the present invention, refractory materials containing substantial amounts, for instance more than 50 per cent by weight, of magnesium orthosilicate can be made which are considerably more resistive against destruction during prolonged service at extremely high temperatures than previous refractories of the same or similar chemical composition, and also other important properties, such as the cold crushing strength and resistivity against thermal shock, are materially improved by the same method.

For other non-plastic refractories, such as chromite or magnesite, the manufacture of dense products has been satisfactorily made by means of a combination of grading the grains sizes and moulding under high hydraulic pressures, such as 600 or 1000 kg. per sq. cm. For refractories containing substantial amounts of granular comminuted dunite rock such a procedure cannot be recommended, because the hard grains are so brittle that they are crushed under high pressures, thereby impairing the strength of the products.

Therefore, one cannot adopt methods as used for other nonplastic refractories, but it has been found possible to make satisfactory dense bricks having magnesium orthosilicate as the main constituent, by methods of combined densifying effect of several measures such as elimination of certain objectionable constituents, and reduction of moisture and shrinkage of shaped products by means of firing.

As the refractories concerned are intended for service at very high temperatures, such as in roofs of open hearth furnaces, they must conform to a high standard of refractoriness, corresponding to a temperature of failure under load of not less than 1500° C., the load being 25 lbs. per square inch, according to the procedure of the American Society for Testing Materials. Only a slight compression under load at 1500° C. may be permitted. It therefore is important to exclude from the method of manufacture any steps impairing the refractoriness, even if such steps might be apt to decrease porosity. I have found that incorporation of such bonding substances as alkaline compounds, such as sodium silicate, and compounds of alumina, such as clay, kaolinite, bauxite, and aluminous cement, have a special fluxing effect upon substances rich in magnesium orthosilicate, and in the manufacture of products according to the present invention, these substances must be avoided or their amount must at least be restricted to a minimum, preferably not exceeding in aggregate 1 per cent of the dry batch.

I have also found that the incorporation of solid hydrates such as magnesium hydroxide, or solid easily hydratable substances such as caustic magnesium oxide is objectionable in the manufacture of products of low porosity according to the present invention, as the presence of such substances in the batch causes high porosity of the products under service conditions. For manufacture of ordinary forsterite refractories, caustic magnesium oxide is well apt, but for practising the present invention, the caustic oxide has to be replaced by other types of magnesium oxide, such as dead burned or sintered or fused magnesite which is less easily hydrated. The words "dead burned magnesite" in the following also means its equivalents "sintered magnesite" and "fused magnesite." The amount of dead burned magnesite preferably shall not exceed about 35 per cent by weight of the fines and in most cases preferably shall not exceed about 25 per cent by weight of the fines.

The amount of solid hydrates and of easily hydratable substances shall be kept as low as possible and shall preferably not exceed in aggregate 2 per cent by weight of the refractory. The amount of uncalcined serpentine, if present in the finely divided parts of the batch, preferably shall not exceed 5 per cent by weight of the dry entire batch and shall be kept as low as practically possible. Generally it is recommended for the manufacture of refractories according to the present invention to use dunite rocks which are poor in hydrated magnesium silicates, and it is recommended to avoid the incorporation of these and other hydrosilicates. The incorporation of such substances as clay, kaolinite, bauxite is not only harmful because they contain alumina, but also because they are hydrosilicates, respectively hydrates. The incorporation of aluminous cement is objectionable as it is also an easily hydratable substance, tending to increase porosity of the fired products.

The disintegration and grading of the raw materials generally can be made in the same manner as in the manufacture of known refractories containing magnesium orthosilicate. The batch is made in part from granular material, for instance having a grain size between 0.3 and 8.0 mm., and in part from finely subdivided material in amount sufficient to fill the spaces between the particles of the granular material. Therefore the dry batch according to the present invention preferably should contain at least 25 per cent by weight of finely divided material to 75 per cent by weight of granular material, preferably at least 30 per cent of fine material. An upper limit of the relative amount of fine material cannot be given absolutely, but the very best results are being obtained with amounts of the finely divided materials not exceeding 60 per cent by weight and preferably not exceeding 45 per cent by weight of the entire material of the dry refractory. The balance of the refractory comprises granular material, the weight percentages of which are between 40 and 75 per cent, preferably between 55 and 70 per cent of the refractory, excellent results having been obtained with 60-65 per cent of granular material and 40-35 per cent of finely divided material.

The finely divided material preferably has to be finely subdivided, for instance by milling it in ball mills and the like, either by dry or wet milling to particle sizes between, for instance, about 0.2 mm. and colloidal dimensions, such as 0.001 mm., or between 0.2 mm. and about 0.01 mm., these numbers, however, being mentioned only as examples, not as limitations.

The granular fraction of the most important refractories according to the present invention consists mainly or substantially of substances rich in magnesium orthosilicate, such as comminuted natural olivine rock, especially dunite poor in iron compounds, or for instance of dense synthetic forsterite. The more finely comminuted constituents of the refractory, according to the present invention, consist of refractory substances which are stable at high temperatures in contact with magnesium orthosilicate. Such substances are, besides magnesium orthosilicate itself, or finely subdivided dunite rock, substances such as magnesium oxide, MgO, and certain refractory spinels, especially those spinels which contain only subordinate amounts of alumina or are free from alumina, such as magnesium ferrite ($MgFe_2O_4$), magnesium chromite ($MgCr_2O_4$), and chromite ores, preferably such chromite ores which contain not more than about 12-14 per cent by weight of $Al_2O_3$. Each of those possible components of the finely subdivided fractions of the raw materials may be used as the sole or the dominating constituent of the matrix between the granules or of the filling between the granules, or there may be used any binary mixture, containing two of those components, for instance magnesium oxide and chromite ore or magnesium ferrite as described. Again, mixtures of fines containing more than two components may be used containing at the same time magnesium orthosilicate, magnesium oxide and for instance chromite ore poor in alumina.

The amount of moisture which is incorporated into the batch for plastifying it prior to the moulding or prior to other processes of making consolidated bodies, such as bricks, shapes, linings, has to be limited not to exceed about 6 per cent by weight of the total weight of dry refractory and it shall preferably be less than 5 per cent by weight, such as, for instance, between 3 and 5 per cent by weight. As the minimum amount of moisture which is necessary for plasticizing is dependent upon the exact composition and particle grading of the batch, it is recommendable to find that minimum percentage by separate tests, as I have found that each per cent of moisture in excess of that minimum causes about 3 per cent increase of porosity. The word "moisture" means such substances as water, aqueous solutions, other liquids and solutions such as, for instance, oils. For effecting the cold bonding of the shaped products bonding materials known in the art of making refractories may be used, such as cellulose waste liquor (lignine liquor), solutions of molasses, treacle, and very small amounts of boric acid, the last substance restricted to less than 0.5 per cent of the weight of the dry refractory. A very useful bonding material is a solution of magnesium chloride, especially when the finely divided fractions of the refractory contain magnesium oxide. The magnesium chloride has a bonding effect on dead burned, sintered or fused magnesium oxide, when used in accordance with the present invention; in earlier manufacture the presence of caustic magnesium oxide has been considered to be preferable for that type of chemical bonding. The amount of $MgCl_2$ has to be small, preferably between 0.1 and 0.5 per cent by weight of the dry refractory.

Some difficulty may arise in mixing a very small amount of moisture, for instance 3 or 4 per cent by weight of the dry refractory batch, intimately with the refractory substances, composed of granular material and of finely divided material. It has been found that one suitable manner of incorporating the whole or part of the moisture into the batch is as follows: A fraction of the dry materials is wet milled together with the whole or part of the moisture in order to form a finely milled pulp containing that amount of moisture which is sufficient or nearly sufficient for plasticising the batch. This wet pulp is then mixed with the dry materials. In some cases it is preferable to use another part of the moisture to moisten the granular fractions and afterwards to mix the moistened granular fractions with the moistened fines. In many cases it is found advantageous to have about one sixth to one half of the fines wet milled, preferably about one third of the fines, with an amount of moisture which corresponds to about 2.5 to 4.5 per cent by weight of the total dry materials of the refractory. In wet milling such substances as magnesium oxide care must be taken to avoid the formation of objectionable amounts of magnesium hydroxide and magnesium carbonate. Wet milling therefore has to be limited to a short time, for instance it has been found that milling of sintered magnesite in water for 4 hours in a ball mill does not form objectionable percentages of magnesium hydroxide, if not more than 10 per cent by weight of such wet milled magnesite is incorporated into the refractory and if the wet milled materials are worked up within about 3 days after the wet milling, these data being mentioned as an example, not as a limitation.

In order to obtain as dense a packing as possible, within the limits of commercial economy, the effects of moulding, ramming, jolting, vibrating, pressing or hydraulic pressing can be used in the making of shaped products from the batch, according to methods well known in the art of making refractories. In most cases such moderate hydraulic pressures as between 100 and 300 kg. per sq. cm. have been found to be most satisfactory for manufacturing excellent products in combination with the other steps of manufacture according to the present invention. Higher pressures, for instance up to 1000 kg./cm.$^2$ may be recommended only in some cases for products containing less than 60 per cent by weight of granular material, as the brittle granules otherwise are apt to be crushed. Also the high initial costs for high pressure hydraulic equipment and the heavy wear on the moulds in the case of very hard materials such as dunite make it preferable not to operate with excessive pressure.

The shaped products have to be dried and burned. In some cases the unfired products can be shipped and firing effectuated in the furnaces where the products are being utilized. Chemically bonded unfired products, manufactured according to the present invention, as well as the fired products can be used in manners known to the art for constructing furnaces and the like, for instance reinforced by metallic mantles, sheaths or plates which wholly or in part cover the refractory shaped bodies or are inserted between the refractory bodies. Thereby the expensive step of firing to very high temperatures is avoided. The products in that case can be shipped either unfired or after firing to comparatively moderate temperatures, sufficient to ensure a ceramical bond.

In most cases it is preferable to include the process of firing in the manufacture; that is especially the case if a further reduction of porosity shall be effectuated by means of firing to such temperatures at which shrinkage of the shaped products takes place. In such cases the process of burning has to include heating to shrinkage temperatures which for these highly refractory products I have found to be between 1550° and 1730° C. The temperature and duration of firing depend somewhat on the exact composition of the refractory and have to be found by means of separate test. In manufacture of refractories containing considerable amounts of magnesium orthosilicate, such as refractories containing more than 50 per cent by weight of dunite, substantial shrinkage during commercial firing of shaped bodies hitherto has been carefully avoided, because of the risk of objectionable deformation during such firing. I have found, however, that refractories made according to the present invention, containing neither objectionable bonding materials nor hydrates or easily hydratable substances and comprising a large percentage of granular comminuted dunite, especially from 55–65 per cent by weight, besides finely milled material prepared and moulded as described, can be subjected to considerable shrinkage by means of firing without objectionable deformation of the shapes, the allowable shrinkage amounting up to more than 2 or even more than 4 per cent by volume. By such firing shrinkage the porosity can be reduced considerably. The process of firing can be made in oxidizing, neutral or reducing atmosphere; most effective, under same conditions of temperature, is heating in reducing atmosphere. Excessive shrinkages, for instance in excess of 10 per cent by volume, are not to be recommended.

There are thus several steps in the process of manufacturing which are either necessary or useful for obtaining, in accordance with the present invention, a highly refractory bonded product having low porosity, from raw materials containing magnesium orthosilicate, especially from such materials which comprise not less than 50 per cent by weight of magnesium orthosilicate.

The first step is the selection of suitable raw materials, avoiding hydrates and easily hydratable materials, and avoiding certain bonding materials which hitherto have been common constituents of forsterite refractories.

The second step is a suitable grading of grain sizes, including a large percentage of granular material, such as comminuted dunite rock. This second step is not materially different from earlier manufacture of forsterite refractories.

The third step is the incorporation of a strictly limited amount of moisture into the batch.

The fourth step is the making of shaped bodies from the batch.

The fifth step is the drying of shaped bodies.

The sixth step is the firing of the dried shaped bodies, including a process of shrinkage which has not hitherto been used for manufacture of commercial forsterite refractories.

*Examples*

1. An olivine rock (dunite) having a composition of approximately 42 per cent by weight of $SiO_2$, 49 per cent of MgO, 7 per cent of FeO, 1 per cent of $Cr_2O_3$, 1 per cent of $H_2O$, is comminuted to grain sizes between 0.3 and 0.6 mm. for the granular material and to finely milled material for the fine particles. The finely milled material, prepared by milling in a ball mill, has to pass 90 per cent by weight through a screen of 0.08 mm. mesh width. A batch is provided from 60 parts by weight of the granular material, 40 per cent by weight of the finely milled material and 4 parts by weight of water and 1 part by weight of concentrated cellulose waste liquor (lignine liquor). The mixture of water and cellulose waste liquor is used in such a manner that 1.5 parts of the liquid is used for moistening the granular material, 3.5 parts by weight of liquid are used for moistening the finely divided material. After moistening the granular and fine material are mixed thoroughly, the batch is moulded into bricks in a hydraulic press under a load of 250 kg./cm.$^2$. The bricks are dried and then fired at a temperature of 1580° C. for five hours. After cooling a shrinkage of 6 per cent by volume is observed. The burnt brick has a volume porosity of 21 per cent. After burning for 9 hours at 1700° C. the burnt brick has a volume porosity of 12 per cent.

2. The same dunite rock as in Example 1, is comminuted to give a granular material ranging in grain size between 0.5 and 4.0 mm., and particles of the same rock which are less than 0.5 mm. are used for preparing the finely divided material. Dry milled fines are prepared in a ball mill to pass 85 per cent through a screen of 0.1 mm. openings. Wet milled fines are prepared in a ball mill from 3 parts by weight of dunite and 1 part by weight of a solution made by dissolving 20 grams boric acid, $H_3BO_3$, and 100 grams of sugar molasses per 1000 grams of water. The wet milling results in a pulp. The batch is made in the following manner—65 parts by weight of the granular dunite are moistened by 1 part by weight of the solution of molasses and boric acid, described. A mixture is made from 25 parts by weight of dry dunite fines and 13.3 parts by weight of the wet dunite pulp, then the wet fines and the wet granular material are mixed, the resulting batch containing about 3.8 per cent by weight of moisture. The batch is moulded into shaped bodies under a pressure of 300 kg./cm.$^2$. The dried shapes having a porosity of 20 per cent by volume can be used directly for the lining of furnaces and the like, without previous firing.

3. A dunite sand containing 42 per cent $SiO_2$, 47 per cent MgO, 8 per cent FeO, 1 per cent $Cr_2O_3$, 0.5 per cent CaO, 1.5 per cent $H_2O$ is provided in grain sizes between 0.3 and 4.5 mm. to give a dense packing according to the Fuller curve. 60 parts by weight of such granular dunite sand and 40 parts by weight of a finely divided material are used, which finely divided material consists of comminuted dunite sand 75 per cent by weight, dead burned magnesite 25 per cent by weight. The composition of the dead burned magnesite is 93 per cent MgO, 3 per cent $Fe_2O_3$, 2 per cent $SiO_2$, 1 per cent CaO and 1 per cent loss by firing. The mixture of fines is milled for three hours in a ball mill. The milled fines are moistened with a solution of 200 grams of magnesium chloride hydrate, $MgCl_2.6H_2O$, in 1000 grams of water, using 8 parts by weight of that solution per 100 parts by weight of fines, 100 parts by weight of the granular material are moistened with 2 parts by weight of the same solution. Afterwards moistened fines and moistened granular material are thoroughly mixed, moulded into shapes under a pressure of 260 kg./cm.$^2$. The shapes are dried at temperatures up to 130° C. and fired at 1650° C., and after cooling the shrinkage is found to be about 3 per cent by volume. The fired refractory building material has a volume porosity of 19 per cent.

4. A refractory building material is made from dunite rock, described in Example 1, the dead burned magnesite described in Example 3 and a chromite ore containing 49 per cent $Cr_2O_3$, 13 per cent $Al_2O_3$, 20 per cent iron oxides, 14 per cent MgO, 4 per cent $SiO_2$. The granular material is made from comminuted dunite, grain size between 0.5 and 4.0 mm. The fine material is composed from 20 per cent by weight of dead burned magnesite and 80 per cent by weight of chromite ore. The mixture of magnesite and chromite ore is milled in a ball mill until 90 per cent pass a screen of 0.1 mm. mesh openings. For moistening the fines and the granular material a solution of 200 grams magnesium chloride hydrate, $MgCl_2.6H_2O$ per 1000 grams of water is used. For making the batch 60 parts by weight of granular material and 40 parts by weight of finely milled material are used. The 60 parts by weight of granular material are moistened with 1 part by weight of the magnesium chloride solution, the 40 parts of fines are moistened with 3.8 parts by weight of the same solution, afterwards granules and fines are intimately mixed, then moulded into bricks under a pressure of 260 kg./cm.$^2$, dried at 130° C. for 24 hours, then fired at 1650° C., that maximum temperature being held for 8 hours. After burning no measurable volume shrinkage is found, however; due to the absence of objectionable hydrates and the limited amount of plasticising liquid, the porosity of the product is only 19 per cent by volume. If the same type of brick is fired at 1720° C. for 8 hours, the volume shrinkage is found to be 5 per cent and the porosity of the burned product is 14 per cent by volume.

5. The raw materials and the manner of manufacture are the same as in Example 4, the only difference being that the brick and other shapes are used after moulding and drying, without having been fired, the porosity of the unfired brick being 19 per cent by volume.

6. The same raw materials are used as in Example 4, also the same manner of manufacture, the only difference from Example 4 being that the finely divided material is composed of from 50 per cent by weight of chromite ore, 30 per cent by weight of finely divided dunite and 20 per cent by weight of dead burned magnesite.

These examples have illustrated some important types of refractories which may be manufactured according to the present invention. However, the manufacture and use of refractories of low porosity containing substantial amounts of magnesium orthosilicate is not limited to those refractories in which dunite rock, synthetic forsterite and the like are the main constituents, and which preferably contain not less than 50 per cent by weight of magnesium orthosilicate; but the method may equally well be applied to refractories which contain for instance about 30 to 50 per cent of magnesium orthosilicate such as certain magnesite, chromite and chrome-magnesite refractories. Also for such refractories the disadvantage of peeling off can be reduced or eliminated by reduction of porosity in accordance with the present invention.

According to the provisions of the patent statutes, I have explained the principle of my invention and have described what I now consider to be the best embodiment. However, I desire to have it understood that, within the scope of the appended claims, the invention may be practised otherwise than specifically described.

I claim:

1. That method of making refractories which comprises the steps of making a refractory batch comprising about 40 to about 75 per cent of granular refractory material of high magnesium orthosilicate content, and not over about 60 per cent of finely divided refractory material, said batch being substantially free from substances injurious to the refractoriness of magnesium orthosilicate, mixing said batch with an amount of water not substantially exceeding that just necessary to plasticize the batch, and forming a refractory article from the moist batch, and thereby producing a refractory article characterized in the fired condition by an apparent porosity of about 10 to about 22 per cent, by having a temperature of failure of at least about 1500° C. under a load of 25 pounds per square inch, and by being resistant to peeling during long use at high temperature.

2. That method of making refractories which comprises the steps of making a refractory batch comprising about 40 to about 75 per cent of granular refractory material of high magnesium orthosilicate content, and the remainder finely divided refractory material comprising at least one refractory of the group consisting of magnesium orthosilicate, dead burned magnesia, chrome ore, magnesium ferrite and magnesium chromite, said batch being substantially free from added hydrous silicates, solid hydrated and easily hydratable substances, and substances injurious to the refractoriness of magnesium orthosilicate, mixing said batch with an amount of water not substantially exceeding that just necessary to plasticize the batch, and forming a refractory article from the moist batch, and thereby producing a refractory article characterized in the fired condition by an apparent porosity of about 10 to about 22 per cent, by having a temperature of failure of at least about 1500° C. under a load of 25 pounds per square inch, and by being resistant to peeling during long use at high temperature.

3. That method of making refractories which comprises the steps of making a refractory batch comprising about 40 to about 75 per cent of granular refractory material of high magnesium orthosilicate content, and the remainder finely divided refractory material comprising at least one refractory of the group consisting of magnesium orthosilicate, dead burned magnesia, chrome ore, magnesium ferrite and magnesium chromite, said batch being substantially free from added hydrous silicates, solid hydrated and easily hydratable substances, and substances injurious to the refractoriness of magnesium orthosilicate, mixing said batch with an amount of water not substantially exceeding that just necessary to plasticize the batch, forming refractory shapes from the moist batch, and firing said shapes at a temperature productive of substantial shrinkage, and thereby producing a fired refractory article characterized by an apparent porosity of about 10 to about 22 per cent, by having a temperature of failure of at least about 1500° C. under a load of 25 pounds per square inch, and by being resistant to peeling during long use at high temperature.

4. A method of making refractories according to claim 3, said magnesium orthosilicate material being a low iron dunite.

5. A method of making refractories according to claim 3, said refractory batch comprising about 55 to 70 per cent of said granular material, and 45 to 30 per cent of said finely divided refractory material.

6. That method of making refractories which comprises the steps of making a refractory batch comprising about 40 to about 75 per cent of granular refractory material of high magnesium orthosilicate content in the form of granules from at least about 0.3 to about 8.0 mm. size, and not over about 60 per cent of finely divided refractory material in the form of particles not over about 0.2 mm. size and comprising at least one refractory of the group consisting of magnesium orthosilicate, dead burned magnesia, chrome ore, magnesium ferrite and magnesium chromite, said batch containing hydrous silicates, solid hydrated and easily hydratable substances and alumina in a total amount not injurious to the refractoriness of magnesium orthosilicate, mixing said batch with an amount of water not substantially exceeding that just necessary to plasticize the batch, forming a refractory article from the moist batch, and firing said shapes at a temperature productive of substantial shrinkage, and thereby producing a refractory article characterized in the fired condition by an apparent porosity of about 10 to about 22 per cent, by having a temperature of failure of at least about 1500° C. under a load of 25 pounds per square inch, and by being resistant to peeling during long use at high temperature.

7. A method according to claim 6, the batch containing not over about 2 per cent by weight of solid hydrated and easily hydratable materials.

8. A method according to claim 6, the batch being mixed with not over about 6 per cent of water to prepare it for molding.

9. A method according to claim 6, the batch being made from a low iron dunite as said granular material, and containing not over about 2 per cent of solid hydrates and hydratable substances, and the amount of said water being not over about 6 per cent.

10. A method according to claim 6, the batch containing not over about 5 per cent of alumina.

11. A shaped refractory article formed from a batch mixed with water in an amount just necessary to plasticize it and comprising about 40 to 75 per cent by weight of granular refractory material of high magnesium orthosilicate content, and not over about 60 per cent of finely divided refractory material, and substantially free from hydrosilicates, solid hydrated and easily hydratable substances, and substances injurious to the refractoriness of magnesium orthosilicate, and the refractory being characterized in the fired condition by having an apparent porosity of about 10 to about 22 per cent by weight, by having a temperature of failure of at least about 1500° C. under a load of 25 pounds per square inch, and by being resistant to peeling during long use at high temperature.

12. A shaped refractory article formed from a batch mixed with water in an amount just necessary to plasticize it and comprising about 40 to 75 per cent by weight of granular refractory material of high magnesium orthosilicate content, and not over about 60 per cent of finely divided refractory comprising at least one refractory of the group consisting of magnesium orthosilicate, dead burned magnesia, chrome ore, magnesium ferrite and magnesium chromite, and free from hydrosilicates, solid hydrated and easily hydratable substances and alumina in a total amount injurious to the refractoriness of magnesium orthosilicate, and the refractory being characterized in the fired condition by having an apparent porosity of about 10 to about 22 per cent by weight, by having a temperature of failure of at least about 1500° C. under a load of 25 pounds per square inch, and by being resistant to peeling during long use at high temperature.

13. A shaped and fired refractory article formed from a batch mixed with water in an amount just necessary to plasticize it and comprising about 40 to 75 per cent by weight of granular refractory material of high magnesium orthosilicate content in the form of granules from at least about 0.3 to about 8.0 mm. size, and not over about 60 per cent of finely divided refractory material in the form of particles not over about 0.2 mm. size and comprising at least one refractory of the group consisting of magnesium orthosilicate, dead burned magnesia, chrome ore, magnesium ferrite and magnesium chromite, and substantially free from hydrosilicates, solid hydrated and easily hydratable substances, and substances injurious to the refractoriness of magnesium orthosilicate, and the fired refractory being characterized by having an apparent porosity of about 10 to about 22 per cent by weight, by having a temperature of failure of at least about 1500° C. under a load of 25 pounds per square inch, and by being resistant to peeling during long use at high temperature.

14. A shaped and fired refractory article formed from a batch mixed with water in an amount just necessary to plasticize it and comprising about 55 to 70 per cent by weight of granular refractory material of high magnesium orthosilicate content in the form of granules from at least about 0.3 to about 8.0 mm. size, and about 45 to 30 per cent of finely divided refractory material in the form of particles not over about 0.2 mm. size and comprising at least one refractory of the group consisting of magnesium orthosilicate, dead burned magnesia, chrome ore, magnesium ferrite and magnesium chromite, and substantially free from hydrosilicates, solid hydrated and easily hydratable substances, alumina and substances in amounts injurious to the refractoriness of magnesium orthosilicate, and the fired refractory being characterized by having an apparent porosity of about 10 to about 22 per cent by weight, by having a temperature of failure of at least about 1500° C. under a load of 25 pounds per square inch, and by being resistant to peeling during long use at high temperature.

15. A refractory according to claim 13, said granular refractory material being a low iron dunite.

16. A refractory according to claim 14, said granular refractory material being a low iron dunite.

VICTOR MORITZ GOLDSCHMIDT.